United States Patent
Ai et al.

(10) Patent No.: US 10,060,479 B2
(45) Date of Patent: Aug. 28, 2018

(54) BEARING AND METHOD OF FORMING A BEARING

(71) Applicant: The Timken Company, North Canton, OH (US)

(72) Inventors: Xiaolan Ai, Massillon, OH (US); Ryan D. Evans, Massillon, OH (US); Luc Houpert, Wettolsheim (FR)

(73) Assignee: The Timken Company, North Canton, OH (US)

(*) Notice: Subject to any disclaimer, the term of this patent is extended or adjusted under 35 U.S.C. 154(b) by 0 days.

(21) Appl. No.: 15/305,383

(22) PCT Filed: May 13, 2015

(86) PCT No.: PCT/US2015/030480
§ 371 (c)(1),
(2) Date: Oct. 20, 2016

(87) PCT Pub. No.: WO2015/175603
PCT Pub. Date: Nov. 19, 2015

(65) Prior Publication Data
US 2017/0045086 A1 Feb. 16, 2017

Related U.S. Application Data

(60) Provisional application No. 61/993,422, filed on May 15, 2014.

(51) Int. Cl.
*F16C 33/66* (2006.01)
*F16C 33/64* (2006.01)
(Continued)

(52) U.S. Cl.
CPC ............. *F16C 33/664* (2013.01); *B23P 9/02* (2013.01); *F16C 19/00* (2013.01); *F16C 19/06* (2013.01);
(Continued)

(58) Field of Classification Search
CPC ........ F16C 33/664; F16C 19/00; F16C 19/06; F16C 33/585; F16C 33/64; F16C 33/6648;
(Continued)

(56) References Cited

U.S. PATENT DOCUMENTS 2,252,096 A 8/1941 Pew
4,153,308 A 5/1979 Ladin
(Continued)

FOREIGN PATENT DOCUMENTS

CN 103182664 7/2013
DE 102009042291 4/2010
(Continued)

OTHER PUBLICATIONS

Hirayama et al., "Increase of Film Thickness by Nano-Texturing under Elastohydrodynamic Lubrication," presentation at the 5th World Tribology Congress, Sep. 8-13, 2013, Torino, Italy.
(Continued)

*Primary Examiner* — Marcus Charles
(74) *Attorney, Agent, or Firm* — Michael Best & Friedrich LLP

(57) ABSTRACT

A bearing assembly having an inner race ring (14) that defines an inner raceway and an outer race ring that defines an outer raceway on which the plurality of rolling elements (22) roll. The bearing raceways are machined using surface finishing operations to create preferred surface profiles and textures for improving lubrication performance. The profile of the raceway is initially created using a first grinding process to form a rough surface profile including a rough central band (34) and rough recessed side bands (38). A second grinding process is used to smooth the central band. This raceway surface profile increases lubrication performance.

30 Claims, 3 Drawing Sheets

(51) Int. Cl.
    *F16C 33/58*      (2006.01)
    *F16C 19/06*      (2006.01)
    *B23P 9/02*      (2006.01)
    *F16C 19/00*      (2006.01)
    *F16C 19/16*      (2006.01)

(52) U.S. Cl.
    CPC ............ *F16C 33/585* (2013.01); *F16C 33/64* (2013.01); *F16C 33/6648* (2013.01); *F16C 33/6651* (2013.01); *F16C 33/6681* (2013.01); *F16C 19/163* (2013.01); *F16C 2220/70* (2013.01); *F16C 2223/06* (2013.01); *F16C 2240/54* (2013.01)

(58) Field of Classification Search
    CPC .............. F16C 33/6651; F16C 33/6681; F16C 2220/70; F16C 2223/06; F16C 2240/54; F16C 2220/60; F16C 2223/02; Y10T 29/49636; B23P 15/003; B23P 13/02; B23P 9/02
    USPC .................................. 384/462, 464, 513, 516
    See application file for complete search history.

(56) References Cited

U.S. PATENT DOCUMENTS

| | | | |
|---|---|---|---|
| 4,620,803 A | 11/1986 | Vezirian | |
| 4,828,404 A * | 5/1989 | Takata | F16C 23/086 384/450 |
| 4,916,751 A | 4/1990 | Sumita et al. | |
| 5,019,738 A | 5/1991 | Weilbach et al. | |
| 5,145,267 A | 9/1992 | Takata et al. | |
| 5,150,974 A * | 9/1992 | Tamada | F16C 33/62 384/463 |
| 5,456,538 A | 10/1995 | Honda et al. | |
| 5,498,086 A | 3/1996 | Ou | |
| 5,643,054 A | 7/1997 | Bach et al. | |
| 5,834,094 A | 11/1998 | Etsion et al. | |
| 5,967,672 A | 10/1999 | Akamatsu et al. | |
| 6,371,656 B1 | 4/2002 | De Vries et al. | |
| 6,735,868 B2 | 5/2004 | Loose et al. | |
| 8,123,413 B2 | 2/2012 | Tambe et al. | |
| 8,821,025 B2 * | 9/2014 | Suzuki | F16C 33/6648 384/473 |
| 2003/0019106 A1 | 1/2003 | Pope et al. | |
| 2004/0126045 A1 | 7/2004 | Falone et al. | |
| 2006/0182377 A1 | 8/2006 | Akamatsu | |
| 2007/0258672 A1 | 11/2007 | Tsujimoto et al. | |
| 2013/0326880 A1 * | 12/2013 | Kamamoto | F16C 33/64 29/898 |
| 2014/0056547 A1 * | 2/2014 | Murata | F16C 19/50 384/101 |
| 2014/0079349 A1 * | 3/2014 | Murata | F16C 33/6681 384/475 |

FOREIGN PATENT DOCUMENTS

| | | |
|---|---|---|
| EP | 2672132 | 12/2013 |
| EP | 2711572 | 3/2014 |
| JP | 2000291665 | 10/2000 |
| JP | 2000291665 A | 10/2000 |
| JP | 2009002436 | 1/2009 |
| JP | 2009115187 | 5/2009 |
| JP | 201311010 A | 1/2013 |
| JP | 2013174339 A | 9/2013 |
| JP | 201462564 A | 4/2014 |
| WO | 2004/001238 | 12/2003 |
| WO | 2010/063819 | 6/2010 |
| WO | 2014/099648 | 6/2014 |

OTHER PUBLICATIONS madehow.com, "How Products Are Made—Ball Bearing," <http://madehow.com/Volume-1/Ball-Bearing.html> Webpage accessed Jan. 8, 2014.
prweb.com, "BRM Announces Cylinder Hones for Surface Finishing Main Bearing Bores," <http:www.prweb.com/releases/2013/7/prweb10891064.htm> Webpage accessed Jan. 8, 2014.
International Search Report for Application No. PCT/US2015/030480 dated Oct. 5, 2015.
Written Opinion for Application No. PCT/US2015/030480 dated Oct. 5, 2015.
Japanese Patent Office Action for Application No. 2017-512658 dated Dec. 5, 2017 (9 pages, English translation included).

\* cited by examiner

BEARING AND METHOD OF FORMING A BEARING

RELATED APPLICATIONS

This application claims the benefit of U.S. Provisional Patent Application No. 61/993,422 filed May 15, 2014, the entire content of which is hereby incorporated by reference.

BACKGROUND

The present invention relates to bearings, and more specifically, to surface texture of bearing raceways.

The impact of surface texture on lubrication performance is strongly dependent on tribological component design and application conditions. In applications of surface texturing within the contact zone between rolling elements and raceways of bearings, the contact stress between mating component surfaces is very high. Surface texture within the contact zone may help retain lubricant, but it may also cause near-surface stress concentrations that offset its beneficiary lubrication effects by being potentially detrimental to surface durability.

SUMMARY

In one aspect, the invention provides a bearing assembly including a first race ring defining a first raceway and a second race ring defining a second raceway. A plurality of rolling elements are in rolling contact with the first and second raceways. At least one of the first raceway and the second raceway includes a central region that is in contact with the plurality of rolling elements during normal operation, and at least one recessed side region that is not in direct contact with the plurality of rolling elements during normal operation.

In another aspect, the invention provides a method of forming a bearing assembly having a first race ring defining a first raceway and a second race ring defining a second raceway. A first finishing operation is performed to form a rough surface profile on at least one of the first raceway and the second raceway. The rough surface profile includes a rough side region and a rough central region. A second finishing operation is then performed to decrease the roughness of the central region so that it is smoother than the rough side region.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
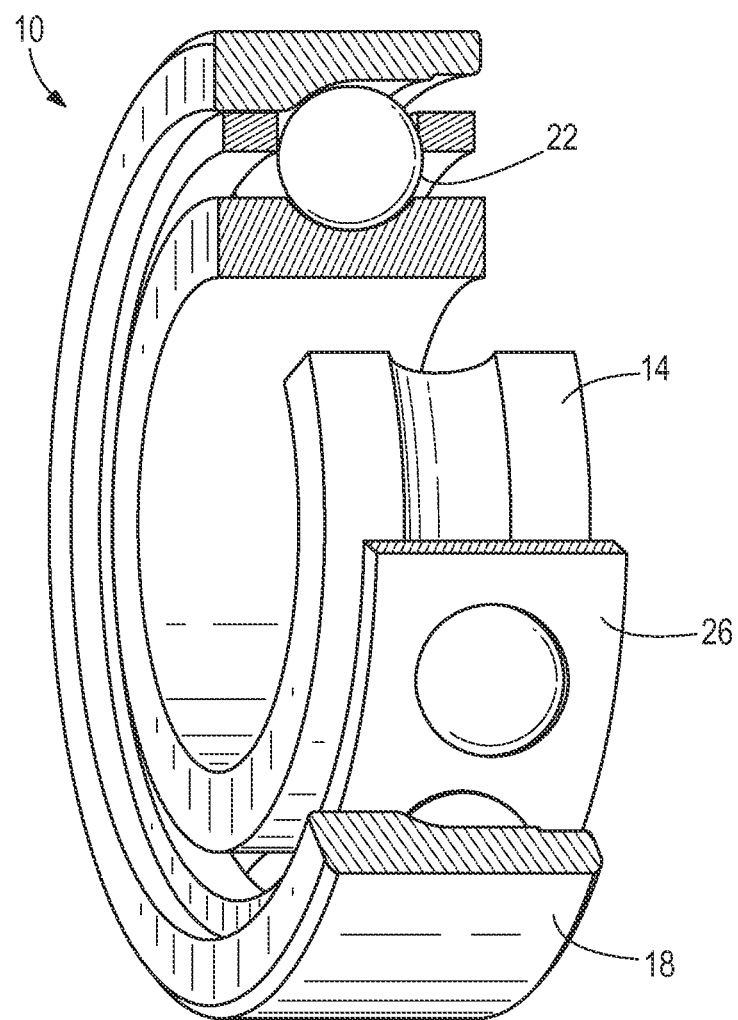
FIG. 1 is a perspective view, partially broken away, of a bearing assembly embodying the invention.
Figure 2:
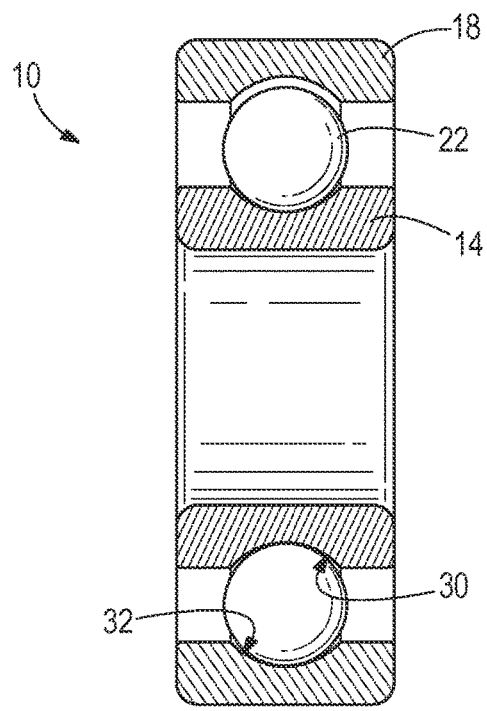
FIG. 2 is a cross-sectional view of the bearing assembly of FIG. 1.
Figure 3:
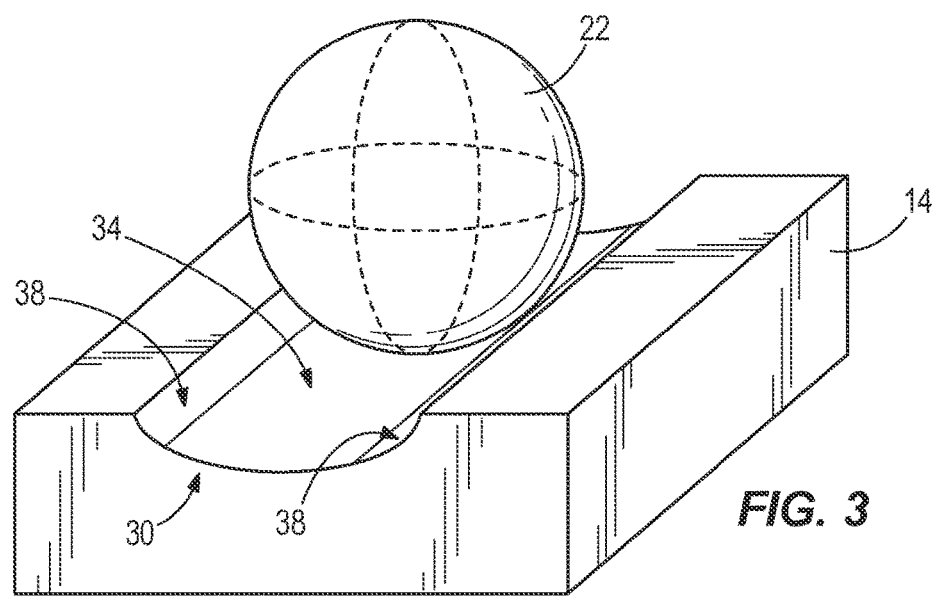
FIG. 3 is a perspective view of a section from the bearing assembly of FIG. 1 illustrating an inner raceway and a rolling element.

FIGS. 1-3 illustrate an embodiment of a bearing assembly 10 usable to support a shaft in a variety of bearing applications, such that the shaft is operable to rotate and transmit force. The bearing assembly 10 includes an inner race ring 14, an outer race ring 18, and plurality of rolling elements or balls 22 positioned between the inner race ring 14 and the outer race ring 18. The plurality of rolling elements 22 can be distanced from each other or held in a desired orientation by a retainer or cage 26. In other embodiments, no cage need be used to provide a full complement bearing. While the bearing assembly 10 is illustrated having balls as rolling elements 22, it is to be understood that different types of bearings with various other rolling elements (e.g., tapered rollers, cylindrical rollers, etc.) may also be used.

The inner race ring 14 defines an inner raceway 30 and the outer race ring 18 defines an outer raceway 32 on which the plurality of rolling elements 22 roll. The bearing assembly 10 is initially created using conventional bearing manufacturing processes and the raceways 30, 32 are then textured after heat treatment using surface finishing processes. The bearing raceways 30, 32 are then machined using the surface finishing operations to create a preferred surface profile and texture for improving lubrication performance.

Figure 4:
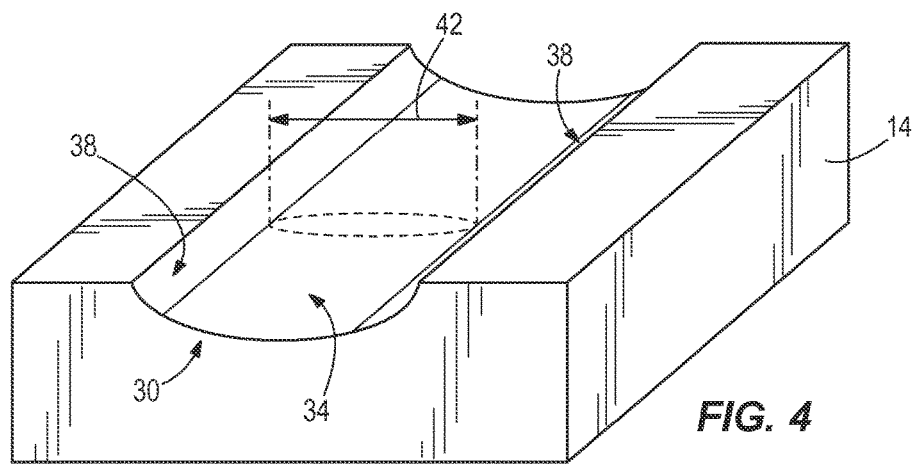
FIG. 4 is a perspective view of the section of FIG. 3 shown without the rolling element.
Figure 5:
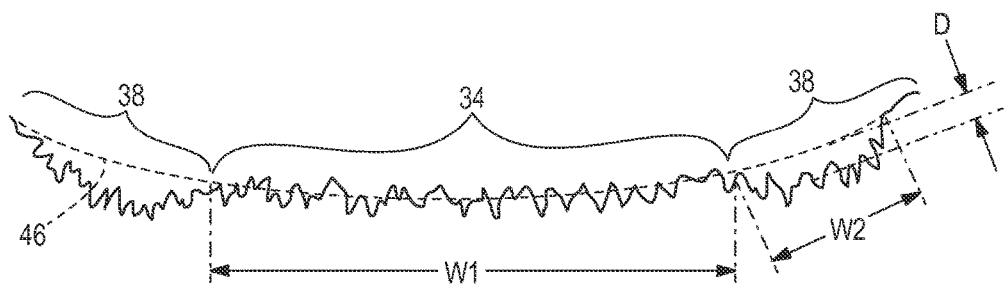
FIG. 5 is a schematic end view of the section of FIG. 4 illustrating a roughness profile before a final finishing operation.

FIGS. 3 and 4 illustrate a surface profile of the inner raceway 30 that has a roller contact surface or central band or central region 34 and two recessed non-contact surfaces or side bands or side regions 38. The side bands 38 extend circumferentially along the inner raceway 30 and surround or sandwich the central band 34. The illustrated central band 34 is shaped in a generally curved manner, according to the desired contact contour with the specific rolling elements (i.e., balls 22) in the illustrated embodiment, and contacts the rolling elements 22 during normal operation of the bearing assembly 10. One of ordinary skill in the art will understand that the contour of the central band 34 would be different for different types of rolling elements. The side bands 38 are recessed into the raceway 30 relative to the central band 34 (and relative to the contour defined by the central band 34 as if it were extended with its same curvature across the regions of the raceway 30 occupied by the side bands 38) and generally do not come into direct contact with the rolling elements 22 during normal operation of the bearing assembly 10. The central band 34 has a width W1 (FIG. 5) that is 0-25% wider than an expected maximum contact length 42 between the rolling element 22 and the raceway 30 for the application duty cycle to avoid excessive edge stress formation. Additionally, the width W1 of the central band 34 is also designed to accommodate the possibility of contact angle variation, such as in spherical roller bearings and angular contact ball bearings applications. Each side band 38 has a width W2 and a depth D (FIG. 5). The manner of measuring the depth D will be explained below. The width W2 of the side bands 38 is smaller than the width W1 of the central band 34 and the depth D is such that the side bands 38 do not typically come into direct contact with the rolling elements 22.

Figure 6:
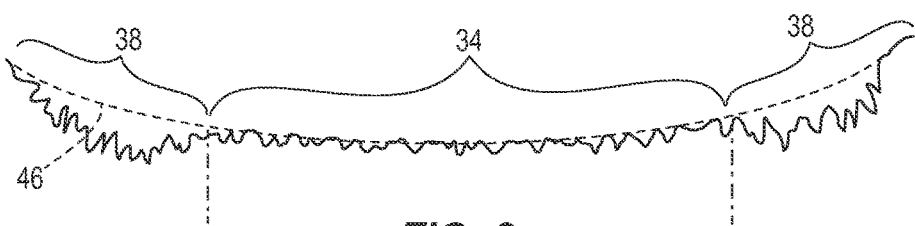
FIG. 6 is a schematic end view of the section of FIG. 4 illustrating a roughness profile after a final finishing operation.

FIGS. 5 and 6 schematically illustrate the surface roughness profiles of the inner raceway 30 before and after a second or final finishing process. The initial roughness profile illustrated in FIG. 5 is created using a first finishing process or rough plunge-grinding operation that uses a grinding wheel dressed to produce a generally rough surface profile. The plunge-grinding operation creates the surface profile with the central band 34 and side bands 38 having the desired central width W1, side band width W2, and side band depth D shown in FIG. 5. The side band depth D is measured from an average roughness line 46 defined by the roughness of the central band 34 and extended along the central band curvature through the side bands 38. The side band depth D is greater than the maximum roughness peak-to-valley height within the central band 34. The grinding process used in creating the initial roughness profile produces longitudinal micro-grooves oriented generally parallel to the travel direction of the rolling element 22 on the raceway 30. The arithmetic average roughness $R_a$, or root mean square roughness $R_q$, measured across grooves is on the same order as, but not greater than, the depth D of the side bands 38. This prevents the peaks of the rough surface profile within the side bands 38 from extending outwardly such that they come into contact with the rolling element 22. The texture within the side bands 38 may additionally, or alternatively, include cross-hatched, isotropic, dimpled, or other textured patterns.

FIG. 6 illustrates the surface profile of the inner raceway 30 after a final finishing process is completed. The final finishing process may include grinding and/or honing to significantly reduce the surface roughness of the central band 34. The final finishing process has little or no impact on the surface roughness of the side bands 38. After the final finishing process, the roughness of the central band 34 is noticeably less than the roughness of the side bands 38. The formation of the central band 34 with a lower roughness, and recessed side bands 38 with a higher roughness increases or enhances the surface-separating hydrodynamic lubricant film thickness formed between the rolling elements 22 and the raceway 30 within the central band 34. The side bands 38 affect the side flow properties of the lubricated contact area to improve the general lubrication performance.

In elastohydrodynamic lubrication (EHL) conditions, such as those usually found in rolling element bearings under service loads, the lubricant flow behavior into and out of the contact region depends on a balance of several factors. Lubricant enters the contact region via an inlet, is entrained through the center of the contact region, and passes predominantly through an outlet of the contact region. Some lubricant will also exit the contact region through side flow or side leakage. However, lubricant availability or starvation in the vicinity of the contact region determines the formation and the thickness of the lubricant film at the center of the contact region. The bearing surface profile described above provides a reservoir of lubricant in the vicinity of where side leakage would normally occur. More lubricant will be carried by the rolling elements 22 at the side bands 38. This lubricant will then be redirected by the centrifugal effect along the curved surfaces to the center band 34 outside of the contact region. This improves the availability of lubricant at the inlet of the contact region between the balls 22 and the center band 34. Generally, the recessed side bands 38 increase the availability and flow characteristics of lubricant in the close proximity of the EHL side leakage zones, which improves the availability of lubricant at the entrance of the EHL contact region for the following contact cycle. The recessed side bands 38 may also reduce side leakage and therefore help increase the total EHL film thickness. Increased EHL film thickness generally results in increased rolling element bearing service life.

Additionally, by surface texturing a recessed region rather than a rolling contact region, the beneficial lubrication effects of surface roughness can be used without the negative effects of creating near-surface stress concentrations that may potentially be detrimental to surface durability. The roughness in the bottom of the recessed side bands 38 may be engineered to further beneficially affect EHL side leakage zones in the contact region. Roughness features may be formed in the side bands 38 to create a pumping action in the vicinity of the contact side leakage zones, further manipulating the pressure and lubricant availability conditions in those areas to bolster overall EHL film thickness by affecting side leakage behavior.

The process for forming the bearings described above starts by creating the bearing assembly 10 using conventional bearing manufacturing processes. A grinding wheel is then dressed for imparting the proper profile on the bearing raceway 30. After the grinding wheel is prepared, the bearing assembly 10 is heat treated and a first finishing operation (e.g., rough plunge-grinding) is performed to form a rough surface profile (as shown in FIG. 5) on at least one of the inner raceway 30 and the outer raceway 32. The rough surface profile includes the rough side regions 38 and the rough central region 34. A second finishing operation is then performed to decrease or smooth the roughness of the central region 34 (as shown in FIG. 6) so that it is smoother than it was after the first finishing operation and smoother than the roughness of the side regions 38. For example, the initial surface roughness in the central band 34 and the final surface roughness in the recessed side bands 38 may have an average roughness value of about 10 microinches to about 40 microinches after the first finishing operation. After the second finishing operation for the central band 34, the surface roughness of the final central band 34 may have an average roughness value of about 4 microinches to about 10 microinches. Stated differently, a roughness ratio between the recessed side bands 38 and the central band 34 is greater than 1 and up to about 10. In other embodiments, the ratio may be greater than 1 and up to about 40. In other embodiments, the ratio may be greater than 2.

The initially rough surface profile generated by the plunge-grinding operation may also be produced by hard-turning or other suitable machining processes depending on the bearing size and manufacturing volume required. Similarly, it is to be understood that the final finishing operation may also be performed by other suitable mechanical, electrical, optical/laser-assisted, or chemical processes. As an example, the final finishing operation may be chemically assisted by a mechanical tumbling process where the side bands 38 are masked to protect the preferred texture.

Additionally, it should be understood that the method of producing a surface profile and texture as described above can also be applied to the outer raceway 32 of the outer race ring 14 or to any raceway of other various types of rolling element bearings (e.g., spherical, cylindrical, tapered, etc.).

Various features and advantages of the invention are set forth in the following claims.

What is claimed is:
1. A bearing assembly comprising:
an inner race ring defining an inner raceway;
an outer race ring defining an outer raceway;
a plurality of rolling elements in rolling contact with the inner raceway and the outer raceway;

wherein at least one of the inner raceway and the outer raceway includes,
  a central region that is in contact with the plurality of rolling elements during normal operation, and
  at least one recessed side region that is not in contact with the plurality of rolling elements during normal operation; and
wherein the at least one recessed side region has longitudinal micro-grooves oriented generally parallel to a travel direction of the rolling elements.

2. The bearing assembly of claim 1, wherein the at least one recessed side region has a surface roughness greater than a surface roughness of the central region.

3. The bearing assembly of claim 2, wherein the at least one recessed side region improves lubrication performance of the bearing assembly by increasing the retention of lubricant due to a greater surface roughness.

4. The bearing assembly of claim 1, wherein the central region is located between two recessed side regions.

5. The bearing assembly of claim 1, wherein both the inner raceway and the outer raceway each include the central region and the at least one recessed side region.

6. The bearing assembly of claim 1, wherein the ratio of roughness between the at least one recessed side region and the central region is greater than 1 and up to about 40.

7. The bearing assembly of claim 1, wherein the at least one recessed side region has average roughness value of about 10 microinches to about 40 microinches.

8. The bearing assembly of claim 7, wherein the central region has average roughness value of about 4 microinches to about 10 microinches.

9. The bearing assembly of claim 1, wherein central region has a width W1 that is 0-25% wider than an expected maximum contact length between the rolling elements and the at least one of the inner raceway and the outer raceway on which the central region is formed.

10. The bearing assembly of claim 9, wherein the at least one recessed side region has a width W2 smaller than the width W1 of the central region.

11. The bearing assembly of claim 1, wherein the at least one recessed side region has a depth D measured from an average roughness line defined by a roughness of the central region and extended along a central region curvature through the at least one side region, the side region depth D being greater than a maximum roughness peak-to-valley height within the central region.

12. A method of forming a bearing assembly comprising:
  creating a bearing assembly having an inner race defining an inner raceway and an outer race defining an outer raceway;
  performing a first finishing operation to form a rough surface profile on at least one of the inner raceway and the outer raceway, the rough surface profile including at least one rough recessed side region and a rough central region, the at least one rough recessed side region being recessed relative to the rough central region; and
  performing a second finishing operation to decrease the roughness of the rough central region to produce a central region that is smoother than the rough recessed side region.

13. The method of claim 12, wherein the first finishing operation is a first grinding operation and the second finishing operation is a second grinding operation.

14. The method of claim 12, wherein one of the first finishing operation and the second finishing operation includes one of the group consisting of a mechanical, electrical, optical/laser-assisted, or chemical finishing operation.

15. The method of claim 12, further comprising retaining lubricant in the at least one recessed side region to improve lubrication performance of the bearing assembly.

16. The method of claim 12, wherein the central region is located between two recessed side regions.

17. The method of claim 12, wherein the first finishing operation and the second finishing operation are performed on both the inner raceway and the outer raceway.

18. The method of claim 12, wherein performing the second finishing operation creates a ratio of roughness between the at least one recessed side region and the central region that is greater than 1 and up to about 40.

19. The method of claim 12, wherein performing the first finishing operation creates an average roughness value on the at least one rough recessed side region of about 10 microinches to about 40 microinches.

20. The method of claim 19, wherein performing the second finishing operation creates an average roughness value on the central region of about 4 microinches to about 10 microinches.

21. The method of claim 12, wherein the at least one recessed side region has a depth D measured from an average roughness line defined by a roughness of the central region and extended along a central region curvature through the at least one side region, the side region depth D being greater than a maximum roughness peak-to-valley height within the central region.

22. The method of claim 21, wherein the first finishing operation creates longitudinal micro-grooves in the at least one recessed side region and oriented generally parallel to a travel direction of the rolling elements.

23. A bearing assembly comprising:
  an inner race ring defining an inner raceway;
  an outer race ring defining an outer raceway;
  a plurality of rolling elements in rolling contact with the inner raceway and the outer raceway;
  wherein at least one of the inner raceway and the outer raceway includes,
    a central region that is in contact with the plurality of rolling elements during normal operation, and
    at least one recessed side region that is not in contact with the plurality of rolling elements during normal operation, the at least one recessed side region having a surface roughness greater than a surface roughness of the central region to improve lubrication performance of the bearing assembly by increasing retention of lubricant in the at least one recessed side region due to the greater surface roughness;
  wherein the at least one recessed side region has a depth D measured from an average roughness line defined by a roughness of the central region and extended along a central region curvature through the at least one side region, the side region depth D being greater than a maximum roughness peak-to-valley height within the central region; and
  wherein the at least one recessed side region has longitudinal micro-grooves oriented generally parallel to a travel direction of the rolling elements.

24. The bearing assembly of claim 23, wherein the central region is located between two recessed side regions.

25. The bearing assembly of claim 23, wherein both the inner raceway and the outer raceway each include the central region and the at least one recessed side region.

26. The bearing assembly of claim 23, wherein the ratio of roughness between the at least one recessed side region and the central region is greater than 1 and up to about 40.

27. The bearing assembly of claim 23, wherein the at least one recessed side region has average roughness value of about 10 microinches to about 40 microinches.

28. The bearing assembly of claim 27, wherein the central region has average roughness value of about 4 microinches to about 10 microinches.

29. The bearing assembly of claim 23, wherein central region has a width W1 that is 0-25% wider than an expected maximum contact length between the rolling elements and the at least one of the inner raceway and the outer raceway on which the central region is formed.

30. The bearing assembly of claim 29, wherein the at least one recessed side region has a width W2 smaller than the width W1 of the central region.

* * * * *